United States Patent
Heiss et al.

(10) Patent No.: US 10,220,714 B2
(45) Date of Patent: Mar. 5, 2019

(54) ACTUATOR MODULE FOR CHARGE INLETS

(71) Applicant: TE Connectivity Germany GmbH, Bensheim (DE)

(72) Inventors: Dominik Heiss, Dielheim (DE); Frank Wittrock, Schriesheim (DE); Dirk Weyrauch, Lorsch (DE)

(73) Assignee: TE Connectivity Germany GmbH, Bensheim (DE)

( * ) Notice: Subject to any disclaimer, the term of this patent is extended or adjusted under 35 U.S.C. 154(b) by 2 days.

(21) Appl. No.: 15/608,246

(22) Filed: May 30, 2017

(65) Prior Publication Data
US 2017/0341524 A1 Nov. 30, 2017

(30) Foreign Application Priority Data

May 31, 2016 (EP) .................................. 16172315

(51) Int. Cl.
*G08B 21/00* (2006.01)
*B60L 11/18* (2006.01)
(Continued)

(52) U.S. Cl.
CPC ...... *B60L 11/1818* (2013.01); *E05B 47/0001* (2013.01); *H01R 13/6278* (2013.01);
(Continued)

(58) Field of Classification Search
CPC .. B60L 11/1818; B60L 2330/12; B60L 15/20; B60L 11/1846; B60L 1/003; B60L 11/14; B60L 11/1805; B60L 2250/20; B60L 2260/22; B60L 2250/16; B60L 2230/12; B60L 2270/32; B60L 2240/28; H02K 11/22; E05B 47/0001; H01R 13/6278; H01R 2201/26; H01R 13/6397; H01R 13/6275; G08B 21/18; Y02T 90/163; Y02T 10/7275; Y02T 10/645; Y02T 10/7088; Y02T 10/7077; Y02T 10/72; Y02T 90/128; Y02T 90/14; Y02T 10/70; Y02T 90/169;
(Continued)

(56) References Cited

U.S. PATENT DOCUMENTS

2008/0034603 A1* 2/2008 Bechtold ............... F16F 9/3292
33/707
2012/0252250 A1* 10/2012 Kurumizawa ..... H01R 13/6275
439/304
(Continued)

FOREIGN PATENT DOCUMENTS

EP    2293391 A2    3/2011
WO   2014092020 A1   6/2014

OTHER PUBLICATIONS

European Search Report, dated Aug. 12, 2016, 7 pages.

*Primary Examiner* — Anh V La
(74) *Attorney, Agent, or Firm* — Barley Snyder

(57) ABSTRACT

An actuator module for locking an electrical connection comprises a lock, a drive unit, and a position detection unit. The lock is movable between an unlocked position and a locked position along a direction of movement. The lock has a trigger. The drive unit moves the lock from the unlocked position to the locked position. The position detection unit has an optical sensor detecting the trigger and determining a position of the lock.

20 Claims, 3 Drawing Sheets

(51) Int. Cl.
  *E05B 47/00* (2006.01)
  *H01R 13/627* (2006.01)
  *H02K 11/22* (2016.01)
  *G08B 21/18* (2006.01)
  *H01R 13/639* (2006.01)
(52) U.S. Cl.
  CPC .......... *H02K 11/22* (2016.01); *B60L 2230/12* (2013.01); *G08B 21/18* (2013.01); *H01R 13/6397* (2013.01); *H01R 2201/26* (2013.01)
(58) Field of Classification Search
  CPC .... Y02T 90/121; Y02T 10/7005; Y04S 30/14; B60K 2015/0561; B60K 2015/0546; Y10T 403/59
  USPC ............. 340/686.1, 438, 455; 439/188, 304; 200/51.05–51.07, 51.09; 70/244; 180/289
  See application file for complete search history.

(56) References Cited

U.S. PATENT DOCUMENTS

| | | | |
|---|---|---|---|
| 2014/0035527 A1* | 2/2014 | Hayashigawa | B60L 11/1818 320/109 |
| 2014/0170879 A1* | 6/2014 | Kahara | B60L 1/003 439/304 |
| 2014/0210410 A1 | 7/2014 | Gorenzweig et al. | |
| 2015/0054462 A1* | 2/2015 | Weidinger | B60L 3/04 320/109 |

\* cited by examiner

ACTUATOR MODULE FOR CHARGE INLETS

CROSS-REFERENCE TO RELATED APPLICATION

This application claims the benefit of the filing date under 35 U.S.C. § 119(a)-(d) of European Patent Application No. 16172315.0, filed on May 31, 2016.

FIELD OF THE INVENTION

The present invention relates to an actuator module for locking an electrical connection and, more particularly, to an actuator module for locking a charge inlet of an e-mobility vehicle.

BACKGROUND

Known electrical connections with a high voltage applied or high currents to be transmitted are capable of being locked, or secured against disconnection. Such locking avoids arcing and consequent damage of connection components.

E-mobility vehicles, for instance electric or hybrid cars, establish an electrical connection during charging only if a plug connector of the charging station is securely and completely plugged into a charge inlet of the e-mobility vehicle. E-mobility vehicles apply known actuators in the charge inlet or the plug connector of the charging station. Those actuators comprise a locking member which is movable from an unlocking position to a locking position. In the unlocking position of the locking member, the charge inlet and the plug connector of the charging station may be removably plugged to each other or disconnected. In the locking position of the locking member, the charge inlet and the plug connector are positively locked and may not be disconnected or unplugged. The locking position of the locking member may further prevent the charge inlet and the plug connector from being mechanically plugged together.

In known e-mobility vehicle actuators, the locked or unlocked status of the locking member is difficult to detect and only a determination of a locked or unlocked state is available, which can lead to unsecured charging of the e-mobility vehicle. Further, after electrically disconnecting the charge inlet of known e-mobility vehicles from the plug connector of the charging station, the locking member is not reliably triggered to unlock the mechanical connection between the charge inlet and the plug connector, preventing mechanical disconnection.

SUMMARY

An object of the invention, among others, is to provide an actuator module for a charge inlet of an e-mobility vehicle which allows for reliably detecting the status of the actuator module. The actuator module according to the invention comprises a lock, a drive unit, and a position detection unit. The lock is movable between an unlocked position and a locked position along a direction of movement. The lock has a trigger. The drive unit moves the lock from the unlocked position to the locked position. The position detection unit has an optical sensor detecting the trigger and determining a position of the lock.

BRIEF DESCRIPTION OF THE DRAWINGS

The invention will now be described by way of example with reference to the accompanying Figures, of which.

DETAILED DESCRIPTION OF THE EMBODIMENTS

Figure 2:
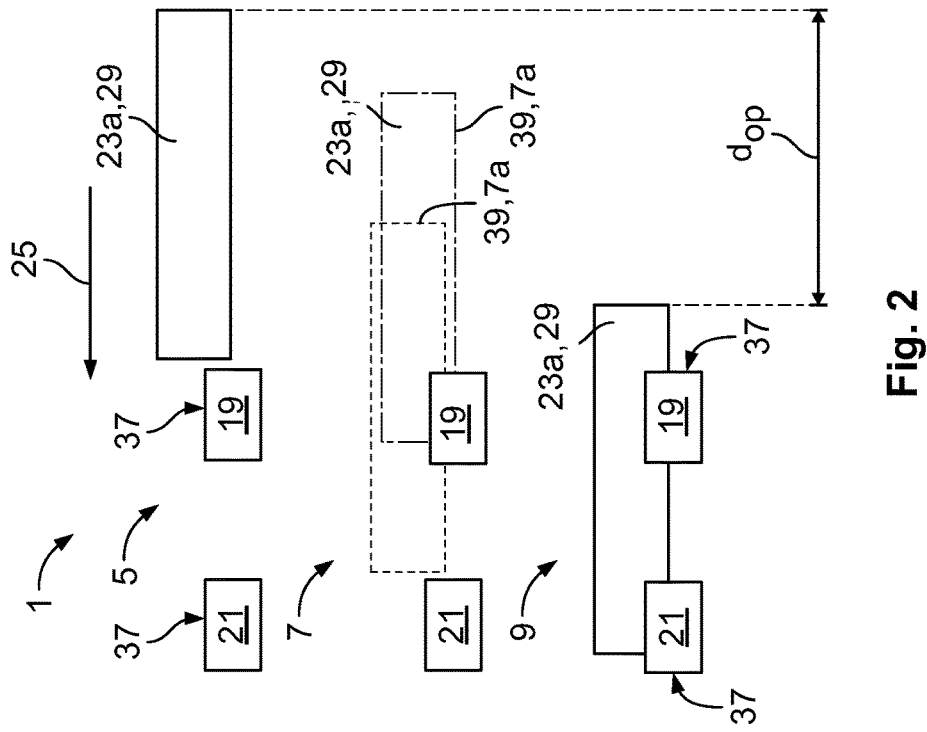
FIG. 2 is a schematic diagram of another trigger and the pair of optical sensors of the actuator module.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Figure 3:
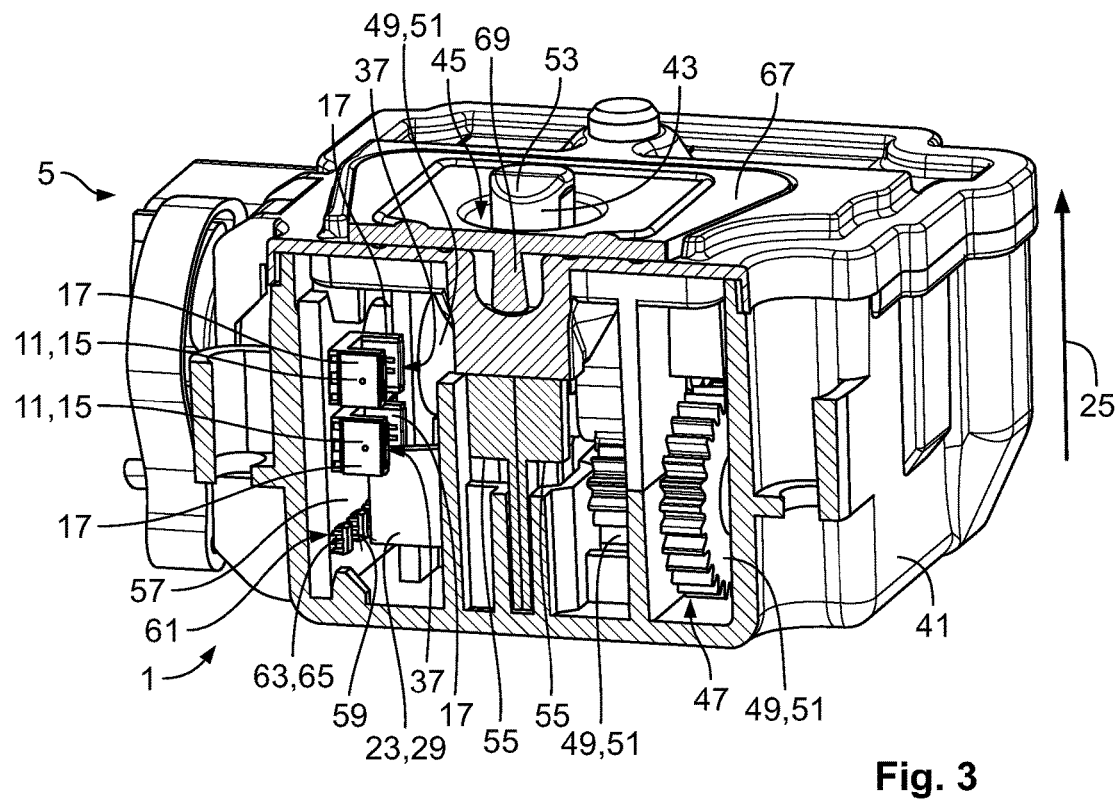
FIG. 3 is a perspective view of the actuator module in an unlocked state.
Figure 4:
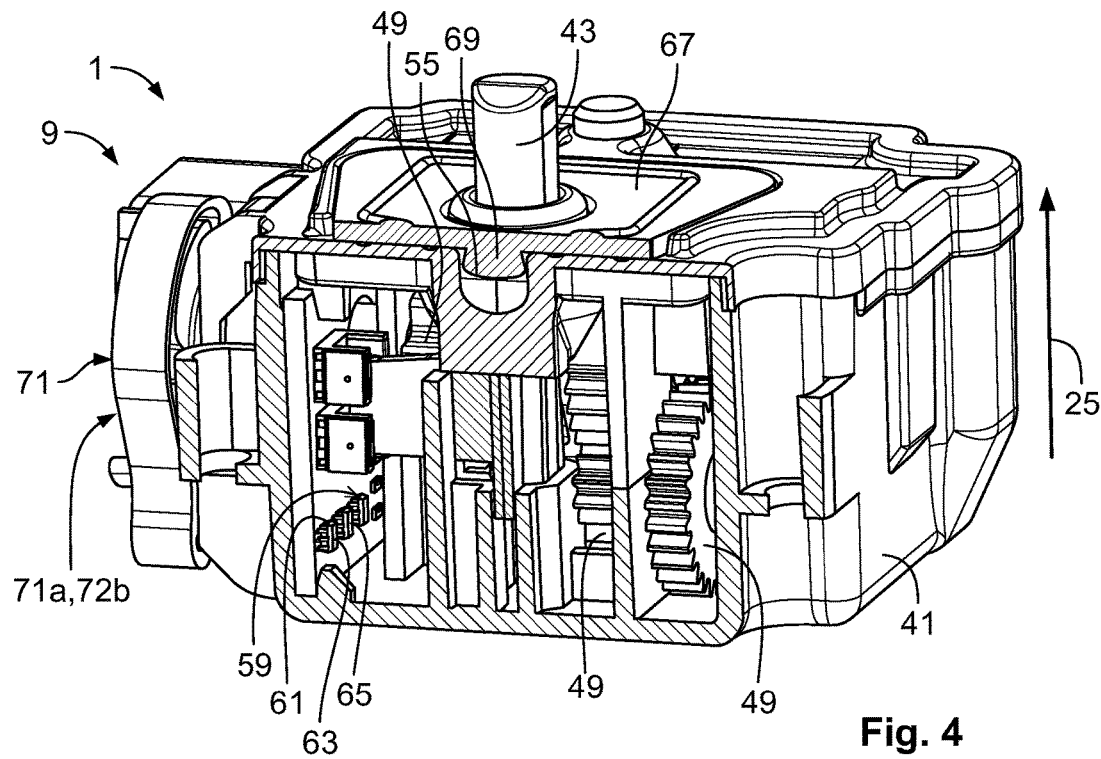
FIG. 4 is a perspective view of the actuator module in a locked state.

An actuator module 1 according to the invention is shown in FIGS. 3 and 4. The actuator module 1 includes a housing 41, a lock 43, a drive unit 47, and a position detection unit 59. The major components of the invention will now be described in greater detail.

The housing 41, as shown in FIG. 3, defines a housing recess 45 which receives the components of the actuator module 1. The housing 41 has an elastic sealing member 67 forming a top surface of the housing 41. The elastic sealing member 67 includes a resilient stop region 69 disposed within the housing recess 45. In the shown embodiment, the elastic sealing member 67 is monolithically formed with the resilient stop region 69.

The lock 43, as shown in FIG. 3, is disposed in the housing recess 45. The lock 43 is movable along a direction of movement 25 by the drive unit 47. The lock 43 is monolithically formed with a trigger 23 extending away from the lock 43 essentially perpendicular to the direction of movement 25. Movements of the lock 43 are directly coupled to movements of the trigger 23. In the shown embodiment, the trigger 23 extends away from one side of the lock 43 in one portion. In other embodiments, the trigger 23 may extend away from the lock 43 in several separated extensions and may extend only on one side of the lock 43 or may be symmetrically positioned on sides of the lock 43 with respect to the direction of movement 25.

The lock 43, as shown in FIG. 3, further comprises a chamfer 53 for facilitating introduction of the lock 43 into a locking recess (not shown), stop surfaces 55 for limiting the movement of the lock 43 opposite to the direction of movement 25, and an internal actuator (not shown) transforming rotational motion imparted by the drive unit 47 into a translational movement of the lock 43 along or opposite the direction of movement 25.

The drive unit 47, as shown in FIG. 3, comprises a plurality of gear members 49. In the shown embodiment, the gear members 49 are pinions 51.

The position detection unit 59, as shown in FIGS. 3 and 4, includes a circuit board 57 on which a plurality of optical sensors 11 are disposed. The position detection unit 59 also includes a signal output line 61, a control unit 63, and an alarm signal line 65 attached to the circuit board 57. The position detection unit 59 is disposed within the housing recess 45.

In the embodiment shown in FIGS. 3 and 4, each of the optical sensors 11 is a fork light barrier 15. The fork light barriers 15 are soldered to the circuit board 57 and are automatically oriented and aligned by this soldering fabrication step. The two fork light barriers 15 are aligned along the direction of movement 25 one behind the other, wherein the trigger 23 may move freely between a pair of fork arms 17 of each of the fork light barriers 15 without mechanically contacting the fork arms 17.

Figure 1:
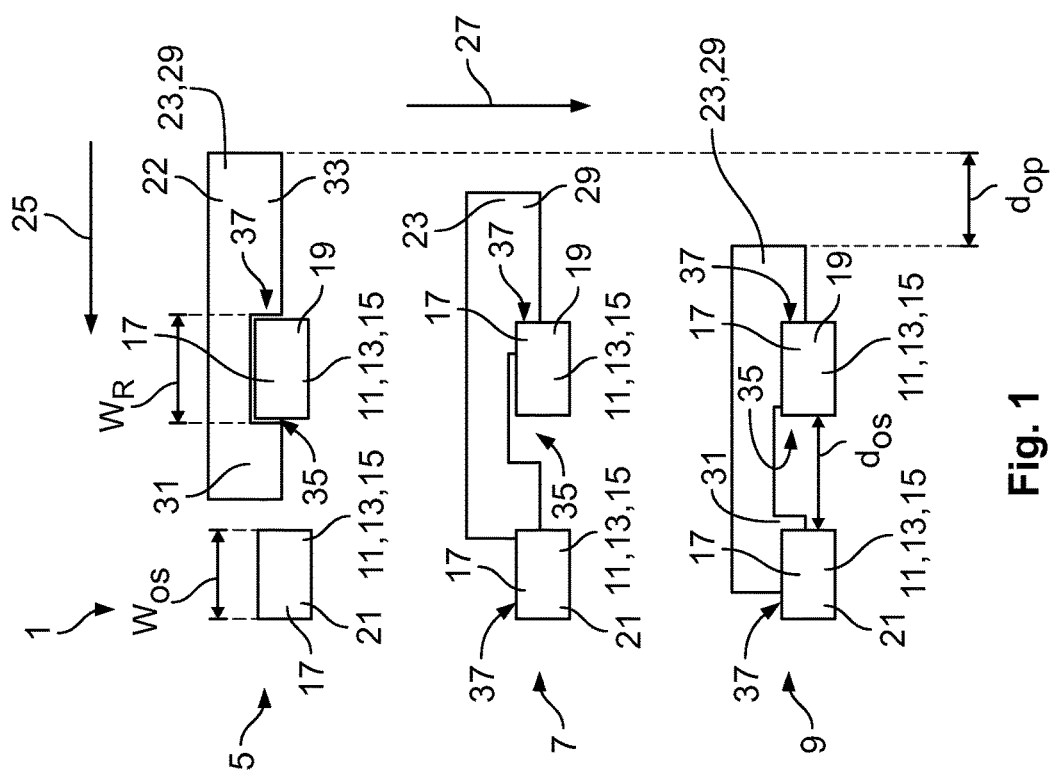
FIG. 1 is a schematic diagram of a trigger and a pair of optical sensors of an actuator module according to the invention.

The function of the actuator module 1 is shown schematically in FIG. 1. FIG. 1 shows three states of the actuator module 1, namely an unlocked state 5, an intermediate state 7 and a locked state 9. In this disclosure, the unlocked state 5, intermediate state 7, and locked state 9 are synonymous with an unlocked position 5, an intermediate position 7, and a locked position 9 of the lock 43.

FIGS. 1 and 3 show the two optical sensors 11 which are embodied as light barriers 13, more specifically as the fork light barriers 15. FIG. 1 is a front view of the optical sensors 11 shown in FIG. 3; only one fork arm 17 of each fork light barrier 15 is visible in FIG. 1, while both opposing fork arms 17 of each fork light barrier 15 are shown in FIG. 3. The U-shape of the fork light barriers 15 is open in a direction opposite to the radial direction 27. A first fork light barrier 19 is located at a distance $d_{OS}$ to a second fork light barrier 21. The distance $d_{OS}$ indicates the free space between the two optical sensors 11.

FIG. 1 further shows an object 22, embodied as the trigger 23, which extends along the direction of movement 25. The trigger 23 also extends along a radial direction 27 and has a flat shape 29. The trigger 23 comprises a first section 33 and a second section 31. In between the first section 33 and the second section 31, the trigger 23 comprises a recess 35 having a width $w_R$ which is larger than a width of an optical sensor $w_{OS}$ and smaller than the distance between the optical sensors $d_{OS}$.

The trigger 23, the first fork light barrier 19, and the second fork light barrier 21 are shown in the unlocked state 5 in FIG. 1. In the unlocked state 5, the trigger 23 is positioned with respect to the optical sensors 11 such that the trigger 23, due to the recess 35, is not located in a detection zone 37 of either of the optical sensors 11. The detection zone 37, best shown in FIG. 3, is located between the fork arms 17 of each fork light barrier 15.

In the intermediate state 7 shown in FIG. 1, the first section 33 of the trigger 23 is moved into the detection zone 37 of the first fork light barrier 19; light emitted from the first fork arm 17 of the first fork light barrier 19 is blocked by the first section 33 and no longer reaches the opposite second fork arm 17 of the first fork light barrier 19. The second section 31 approaches the detection zone 37 of the second fork light barrier 21 but is not yet located within its detection zone 37.

In the locked state 9 shown in FIG. 1, the first section 33 is moved into the detection zone 37 of the first fork light barrier 19 and the second section 31 is moved into the detection zone 37 of the second fork light barrier 21. In the locked state 9, for both fork light barriers 19, 21, the light emitted from the first fork arm 17 is blocked by the first section 33 or the second section 31. FIG. 1 further shows an operating distance $d_{OP}$, which indicates the distance the trigger 23 is moved from the unlocked position 5 to the locked position 9 or vice versa.

FIG. 2 shows the function of the actuator module 1 having a trigger 23a according to another embodiment of the invention. The trigger 23a also has a flat shape 29 but is embodied as a rectangle without the recess 35 of the trigger 23.

FIG. 2 shows the unlocked state 5, the intermediate state 7 and the locked state 9, whereas the intermediate state 7 shows two possible positions 39 of the trigger 23a, the possible positions 39 are indicated by a dotted and dotted-dashed surrounding line of the trigger 23a. The dotted circumferential line of the trigger 23a is shown slightly displaced for an improved visibility of the two positions 39. The two possible positions 39 of the trigger 23a in the intermediate state 7 both correspond to the intermediate state 7 which may also be referred to as drive state 7a or fault state 7b; both possible positions 39 of the trigger 23 in the intermediate state 7 correspond to the drive state 7a in the embodiment shown in FIG. 2. In the locked state 9, the trigger 23a is moved along the direction of movement 25 until the trigger 23a is located in the detection zones 37 of the first fork light barrier 19 and the second fork light barrier 21.

FIG. 2 also shows the operating distance $d_{OP}$ of the trigger 23a, which is larger than the operating distance $d_{OP}$ of the first embodiment of the trigger 23 shown in FIG. 1.

Figure 5:
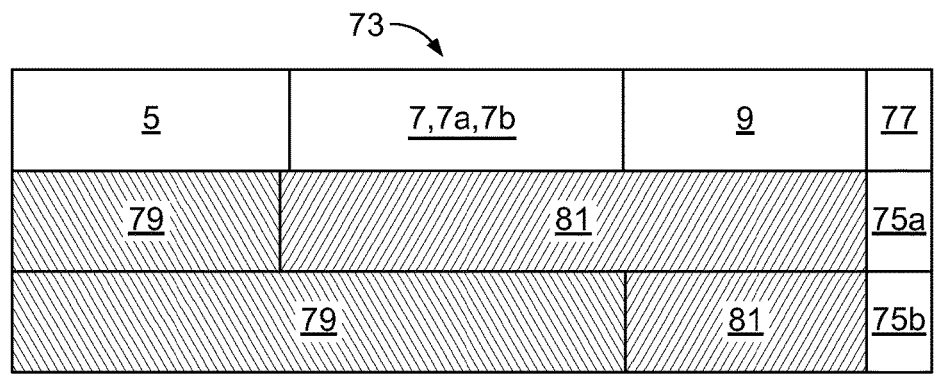
FIG. 5 is a diagram relating a state of the actuator module to a state of each of the optical sensors.

A status diagram 73 of operating the actuator module 1 is shown in FIG. 5. The status diagram 73 relates a first fork light barrier state 75a and a second fork light barrier state 75b to an actuator module state 77.

In the upper row of FIG. 5, the actuator module state 77, namely the unlocked state 5, the intermediate state 7, or the locked state 9 are given, wherein those states 5, 7, 9 depend on the combination of the first fork light barrier state 75a and the second fork light barrier state 75b.

Each light fork barrier 15 may show two different states, an open state 79 or a covered state 81. The open state 79 may also be referred to as off-state and the covered state 81 may also be referred to as on-state. The labeling open and covered solely refers to the light emitted by the fork light barrier 15, wherein one fork arm 17 detects light in the open state 79 and does not detect light in the covered state 81.

The status diagram 73 of FIG. 5 indicates that the unlocked state 5 of the actuator module 1 is detected if the first fork light barrier state 75a and the second light barrier state 75b correspond to the open state 79.

The intermediate state 7 is detected in FIG. 5 as long as the first fork light barrier state 75a corresponds to the covered state 81 and the second fork light barrier state 75b corresponds to the open state. As indicated above, the intermediate state 7 may be further classified into the drive state 7a or the fault state 7b, wherein the assessment of whether the lock 43 is still moving or has encountered an error, fault or malfunction, for example, if the lock 43 gets stuck, depends on a predetermined switching time period. The predetermined switching time period is a time period corresponding to an approximate duration required to move the lock 43 from the unlocked position 5 to the locked position or vice versa. If the intermediate state 7 is determined for a time period longer than the predetermined switching time period, an error, fault or malfunction of the lock 43 is probable and the control unit 63 may output an alarm signal via the alarm signal line 65.

The locked state 9 is indicated in FIG. 5 if the first fork light barrier 75a and the second fork light barrier state 75b each correspond to the covered state 81. In other words, only if the trigger 23 is located in both fork light barriers 15, more specifically is located in the detection zones 37 of both fork light barriers 15, is the locked state 9 detected.

FIG. 3 shows the actuator module 1 in the unlocked state 5, in which the trigger 23 is located outside the detection zones 37 of the fork light barriers 15. FIG. 4 shows the actuator module 1 in the locked state 9, in which the lock 43 is moved in the direction of movement 25 and extends from the housing 41.

The movement of the lock 43 shown in FIGS. 3 and 4, and shown schematically via movement of the trigger 23 in FIGS. 1 and 2, is initiated by the gear members 49 and is damped and stopped by the elastic sealing member 67 which is deformed by the stop surface 55 facing in the direction of movement 25. The elastic sealing member 67 is deformed by this stop surface 55 in the resilient stop region 69 which reversibly deforms upon mechanical contact with the stop surface 55.

As the lock 43 moves, the control unit 63 determines the first fork light barrier state 75a and the second fork light barrier state 75b from signals received from the optical sensors 11, processes the signals, and provides a position signal corresponding to a position of the lock 43 via the signal output line 61. The position signal provided by the signal output line 61 may be provided as an analog or digital signal; it may be provided as a continuous voltage or as a coded signal. In an embodiment, the position signal is one out of three discrete values corresponding to the unlocked position 5, the intermediate position 7, or the locked position 9. The control unit 63 may further comprise a mapping unit relating measured status data provided by the optical sensors 11 to predetermined signals, for example voltage values, which are subsequently provided via the signal output line 61.

The actuator module 1, as shown in FIG. 4, further comprises connectors 71 which may be embodied as plug connectors 71a or plug sockets 71b for transmitting a position signal of the lock 43 or actuator module state 77 detected by the fork light barriers 15 and provided by the signal output line 61 or for transmitting an alarm signal provided by the alarm signal line 65.

Figure 6:
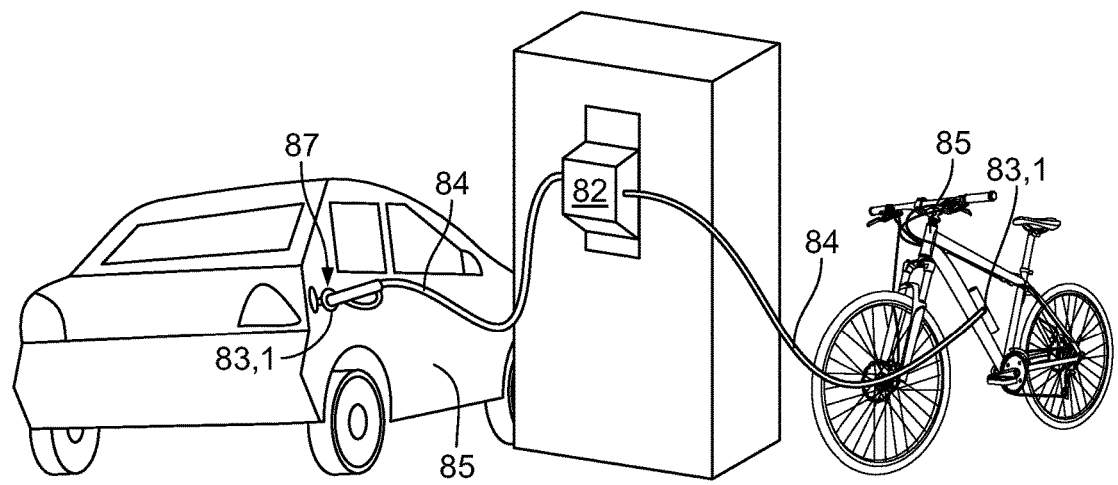
FIG. 6 is a perspective view of an application of the actuator module.

Exemplary applications of the actuator module 1 are shown in FIG. 6. A stationary charger 82 is connected to two e-mobility vehicles 85 via a charging cable 84 which establishes an electric connection 87 with a corresponding charge inlet 83 of the vehicle 85. The electric connection 87 is secured by the actuator module 1, which is disposed in the charge inlet 83.

Advantageously, in the actuator module 1 according to the invention, the optical sensors 11 operate in a contactless manner and movement of the lock 43 is not influenced by a determination of the position of the lock 43. Furthermore, the position detection unit 59 can detect the intermediate position 7 in addition to the locked and unlocked positions 5, 9.

What is claimed is:

1. An actuator module for locking an electrical connection, comprising:
   a lock movable between an unlocked position and a locked position along a direction of movement, the lock having a trigger;
   a drive unit moving the lock from the unlocked position to the locked position; and
   a position detection unit having a plurality of optical sensors detecting the trigger in a detection zone of each optical sensor and determining a position of the lock.

2. The actuator module of claim 1, wherein the trigger is monolithically formed with the lock.

3. The actuator module of claim 1, wherein the trigger extends away from the lock essentially perpendicular to the direction of movement.

4. The actuator module of claim 1, wherein the trigger has a flat shape.

5. The actuator module of claim 1, wherein each of the optical sensors is a light barrier.

6. The actuator module of claim 1, wherein the optical sensors are aligned along the direction of movement.

7. The actuator module of claim 1, wherein the trigger is located in the detection zone of each of the optical sensors in either the unlocked position or the locked position.

8. The actuator module of claim 7, wherein the trigger is located in only one of the detection zones of the optical sensors when the lock is in an intermediate position between the unlocked position and the locked position.

9. The actuator module of claim 1, wherein the position detection unit has a signal output line providing a position signal corresponding to the position of the lock.

10. The actuator module of claim 9, wherein the position detection unit provides an unlocked signal via the signal output line if the lock is in the unlocked position, a locked signal if the lock is in the locked position, and an intermediate signal if the lock is in an intermediate position between the locked position and the unlocked position.

11. The actuator module of claim 10, wherein each of the optical sensors is disposed on a circuit board.

12. The actuator module of claim 11, wherein the position detection unit has a control unit providing the position signal along the signal output line, the control unit disposed on the circuit board.

13. The actuator module of claim 12, wherein the control unit provides an alarm signal along an alarm signal line if the intermediate signal is provided for a time period longer than a predetermined switching time period.

14. The actuator module of claim 6, wherein the trigger has a recess between a first section and a second section of the trigger.

15. The actuator module of claim 14, wherein the recess has a width larger than a width of each of the optical sensors in the direction of movement and smaller than a distance between the optical sensors in the direction of movement.

16. The actuator module of claim 14, wherein, in the unlocked position, the second section of the trigger is positioned between the optical sensors and the recess is aligned with one of the optical sensors such that the trigger is not positioned in the detection zone of any of the optical sensors.

17. The actuator module of claim 5, wherein the light barrier has a first fork arm emitting a light and a second fork arm receiving the light, the trigger blocking the light from reaching the second fork arm when the trigger is positioned in the detection zone of the optical sensor.

18. The actuator module of claim 1, further comprising a housing in which the lock, the drive unit, and the position detection unit are disposed, the housing having an elastic sealing member through which the lock extends and moves along the direction of movement.

19. The actuator module of claim 18, wherein the elastic sealing member is deformed by a stop surface of the lock during movement of the lock along the direction of movement.

20. A charge inlet for an e-mobility vehicle, comprising:
   an actuator module having a lock movable between an unlocked position and a locked position along a direction of movement, the lock having a trigger, a drive unit moving the lock from the unlocked position to the locked position, and a position detection unit having a plurality of optical sensors detecting the trigger in a detection zone of each optical sensor and determining a position of the lock.

\* \* \* \* \*